Jan. 20, 1959
W. H. CHERRY
CROSS TALK ELIMINATING APPARATUS IN A TIME DIVISION MULTIPLEX SYSTEM
2,870,247
Filed May 8, 1950
5 Sheets-Sheet 1

INVENTOR
William H. Cherry
BY
ATTORNEY

INVENTOR
William H. Cherry
BY
ATTORNEY

INVENTOR
William H. Cherry
BY [signature]
ATTORNEY

INVENTOR
William H. Cherry
BY
ATTORNEY

Jan. 20, 1959

W. H. CHERRY 2,870,247

CROSS TALK ELIMINATING APPARATUS IN A TIME DIVISION MULTIPLEX SYSTEM

Filed May 8, 1950

5 Sheets-Sheet 5

INVENTOR.
William H. Cherry
BY
[signature]
ATTORNEY

Patented Jan. 20, 1959

2,870,247

CROSS TALK ELIMINATING APPARATUS IN A TIME DIVISION MULTIPLEX SYSTEM

William H. Cherry, Princeton, N. J., assignor to Radio Corporation of America, a corporation of Delaware Application May 8, 1950, Serial No. 160,664

27 Claims. (Cl. 178—5.2)

This invention relates to apparatus for transmitting and receiving a plurality of signals. In particular, it relates to improvements in the art of multiplexing.

In time division multiplexing practice in communications each of a plurality of signals is sequentially applied to a transmission link. In one type of three color television system, for example, a sample of the red video information in the scene to be televised is transmitted, then a sample of the green video signal, and lastly, a sample of the blue video signal. The sequence is then repeated. At the color television receiver, a distributor applies all the samples of the red information to a means for reproducing red images, all the green samples to a means for reproducing green images, and all the blue samples to a means for reproducing blue images. These various images are combined so as to produce a colored image having all the hues and intensities of the original scene.

Time division multiplexing is also applied to communication of different telephone conversations and radio programs. However, in these latter applications, the outputs of the distributor at the receiver are usually kept separate instead of being combined as in color television.

As the sampling frequency increases, more rapid variations of the original information may be present in the reproduction. In television this means that greater detail can be seen in the reproduced image. However, in accordance with well established theory, there is a limit to the number of completely independent samples that can be sent over a transmission link of a limited bandwidth. When this number is exceeded, information from samples of one intelligence dilutes or interferes with information from samples of other intelligence. This defect is sometimes known as cross talk. From the standpoint of frequency spectra, the cross talk only takes place in a given band of signal or information frequencies known as the cross talk region. The position and width of this cross talk region of frequencies are determined by the type of sampling employed and the relationship of the cutoff frequency of the transmission link to the sampling frequencies.

In most time division multiplexing systems, the information transmitting capacity of the transmission link is equally divided between the separate signals for all signal frequencies. This is without regard for the possible occurrence of cross talk. In effect, equal amounts of the transmission bandwidth are assigned to each signal.

Occasions arise, however, where more bandwidth is required for the satisfactory reproduction of one signal than for another. For example, a high fidelity symphony program contains much more information and hence requires much more bandwidth than a telephone conversation. As another example, the reproductions of either green or red images in color television requires more detailed information and hence more bandwidth than the reproduction of blue images. This is because the eye's acuity for green or red detail is several times its acuity for blue. In such cases it is wasteful of transmission capacity to assign equal amounts of it to each separate signal.

In one previously suggested color television system, however, the information capacity of the transmission link is proportioned between the various component colors in accordance with the information that can be utilized. More bandwidth is devoted to the transmission of red and green signals than to the signals representing the blue content of the scene. In this system, proper assignment of transmission capacity is accomplished by assigning different numbers of samples to each signal. For example, two samples of red and two samples of green may be transmitted for every sample of blue. As the total number of samples transmitted in a given time may remain the same, the cross talk is still a problem when it is desired to transmit the fine details in a scene.

In accordance with the present invention, the capacity of the transmitting link is equally proportioned among the several signal channels for frequencies outside the cross talk region. In the cross talk region the transmission capacity is distributed among a smaller number of the signal channels. In three color television, for example, all video frequencies of red, green and blue up to a predetermined frequency are transmitted in the same way. In the cross talk region beyond this frequency only red and green signals are transmitted. Equivalently, the lower frequencies are transmitted in a three-channel time division multiplex system, and the frequencies in the cross talk region are transmitted in a two-channel time division multiplex system.

Since the minimum spacing between individual samples transmitted in each instance remains the same, cross talk would still be introduced. But by elimination of the transmission of blue signals in the cross talk region, it becomes possible in accordance with this invention to cross feed the green and red information normally lying in the cross talk region so as to effectively eliminate cross talk between them. This cross feed is such that the summation of it and the cross talk normally introduced into the green channel from the red signal passes through zero during sampling intervals. The same is true for the cross feeding of the green signals into the red channel. In between the sampling intervals the signals are distorted, but this makes no difference, as the receiver responds only to the signals during sampling intervals. The cross feeding can be done before sampling at the transmitter or after sampling at the receiver. Alternatively, one cross feeding can take place at the transmitter and another cross feeding can take place at the receiver.

Although the above example relates to a three-channel system, it is to be understood that the basic concepts of the invention apply to more channels. The cross feeding circuits might differ slightly as the number of channels is changed, but the generic concepts are the same. In the cross talk free regions all signals are transmitted, but in the cross talk region some of the signals are not transmitted. In this way, certain signal frequencies of all the signals are always transmitted without cross talk. Where the distribution of transmission capacity is achieved by allotting different numbers of samples to the different signals as noted above, cross talk is always present. The signal frequencies in the cross talk region are generally fairly high so that the cross talk free transmission of a lesser number of signals in this region is preferable to having more signals present with cross talk.

An important feature in this invention is the provision of means for uniformly shifting the phase of the frequencies in the cross talk region.

In accordance with another feature of this invention, the amount of information in the signal that is not transmitted in the cross talk region is effectively doubled by employing known horizontal interlacing principles in a novel manner at both the transmitter and the receiver. This interlacing may be done whether or not the interlacing principle is used in the channels corresponding to red and green.

The terms "horizontal interlacing" and "horizontal interlace" as used in this specification and in the claims refer to a mode of operation whereby each horizontal line is successively scanned effectively in several partial scansions of such a character that, when taken together, they represent a complete scansion of that line. When two such partial scansions are employed, a "double" or "two-to-one" horizontal interlacing is effected. Other ratios also may be used. However, for the purpose of the illustrative embodiments of this invention, reference to horizontal interlacing will be understood to denote a two-to-one interlacing. Further details of this type of interlacing are given in a copending U. S. patent application of R. C. Ballard, Serial No. 117,528, filed September 24, 1949, and titled "Color Television System." It also is to be understood that a color television system in accordance with this invention also employs the standard line or vertical interlacing as described in U. S. Patent No. 2,152,234, granted March 28, 1939, to R. C. Ballard for "Television System."

When horizontal interlacing is not employed in any of the channels, appropriate filters are preferably used at the receivers in order to prevent the introduction of spurious frequencies.

It is accordingly an object of this invention to provide a means for cross feeding certain frequency components of a plurality of signals transmitted by a time division multiplexing system in such a manner as to minimize cross talk.

Another object of the invention is to provide a color television system in which a given number of signal channels share the capacity of a transmitting link for signal frequencies outside of the cross talk region and a smaller number of signal channels share the capacity of the transmitting link for signal frequencies in the cross talk region.

Other objects and advantages will become apparent from a detailed consideration of the drawings in which.

Figures 1, 1A, 1B:
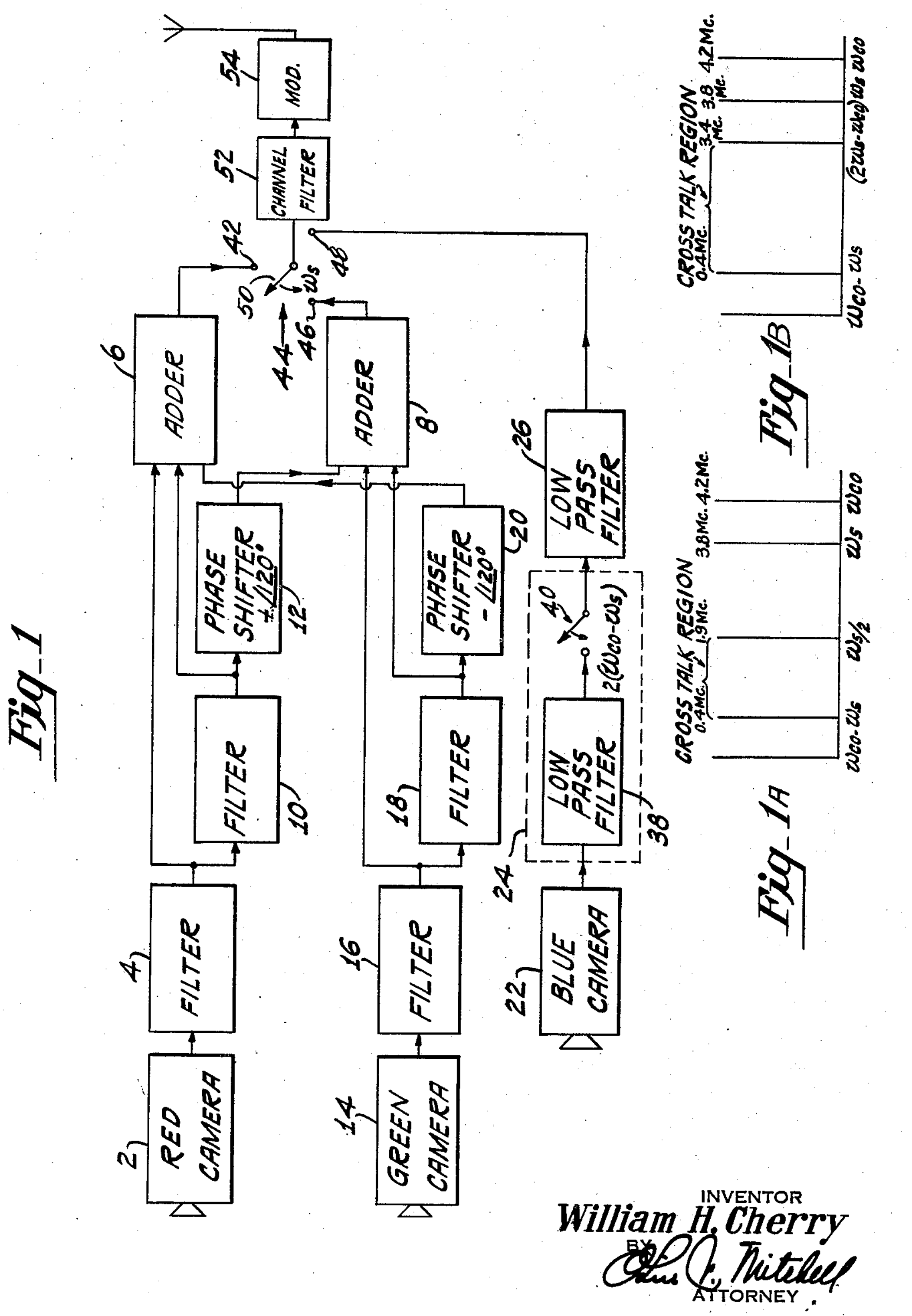
Figure 1 illustrates by block diagram a three-channel time division multiplexing transmitter embodying the principles of this invention.
Figure 1A illustrates graphically the relationships between various frequencies in the system when horizontal interlacing is not employed.
Figure 2:
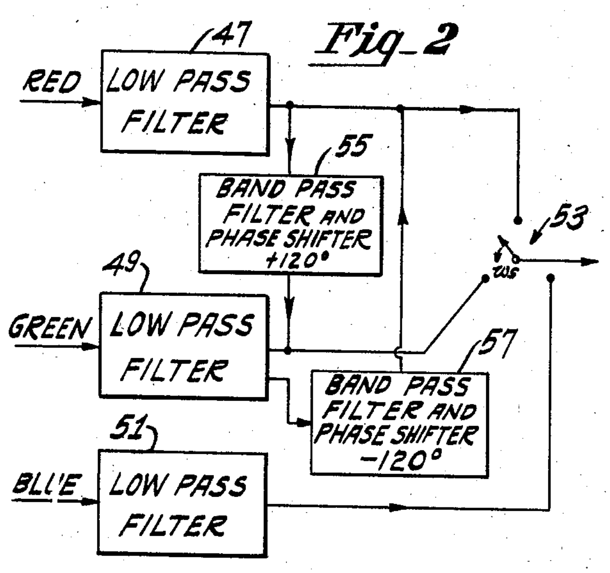
Figure 2A:
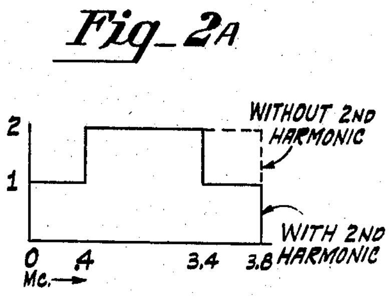
Figure 2B:
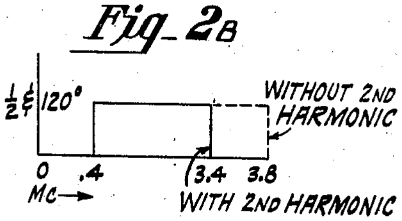
Figure 3:
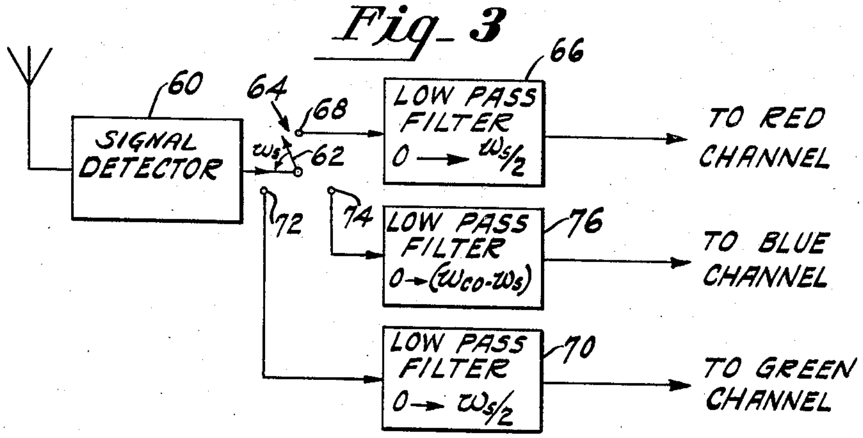
Figure 4:
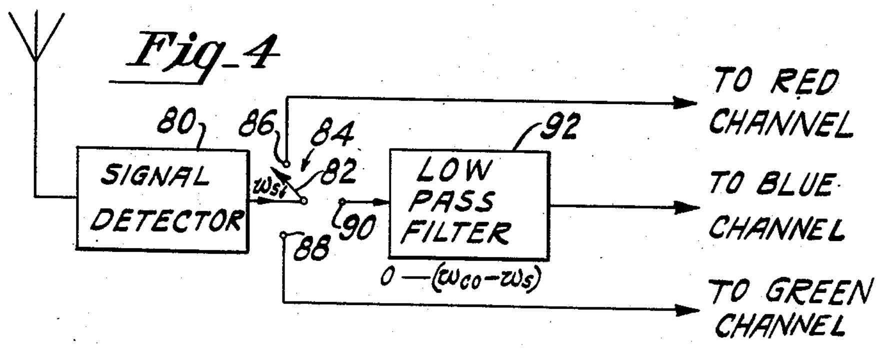
Figures 1C, 5, 7:
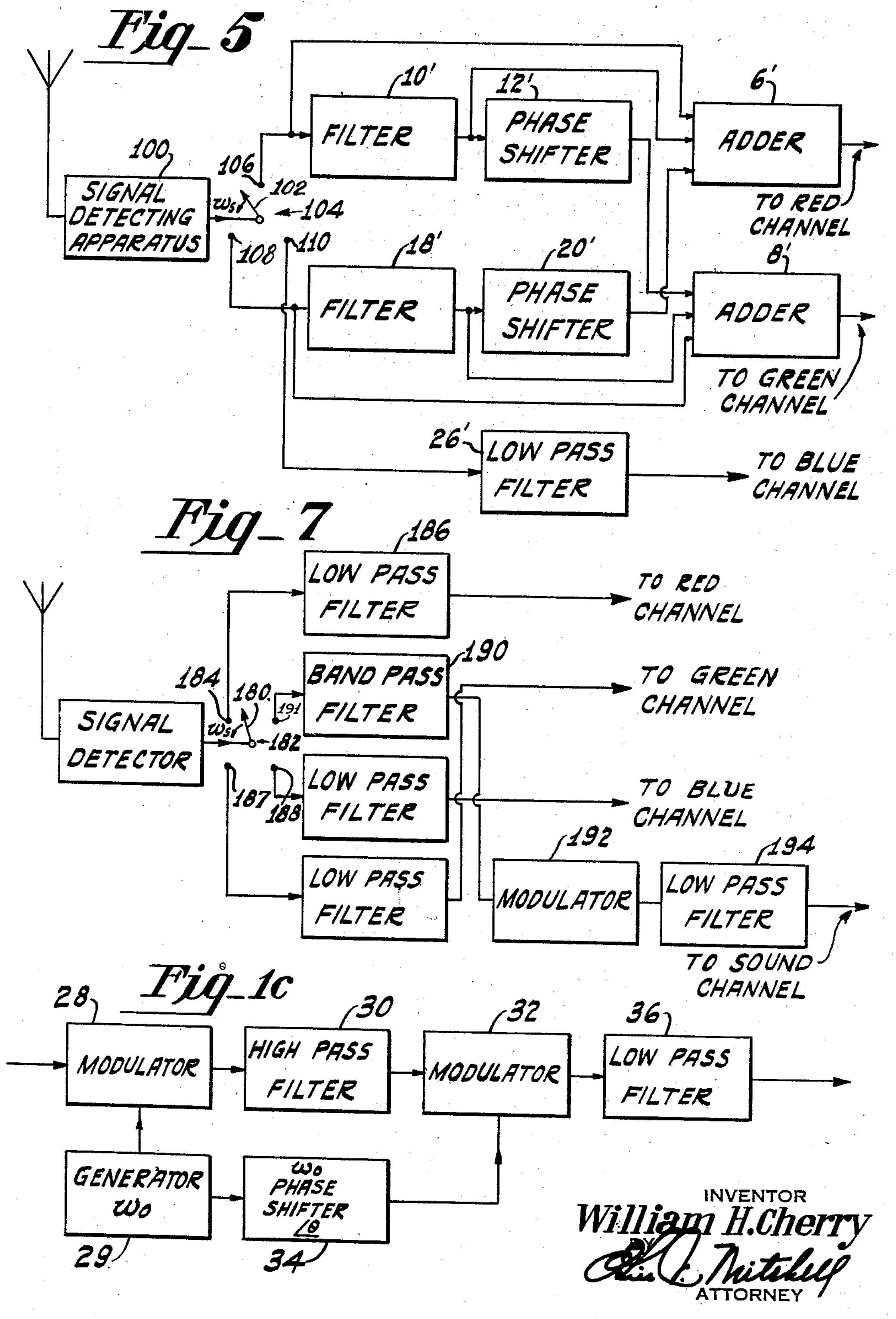
Figures 6, 6A:
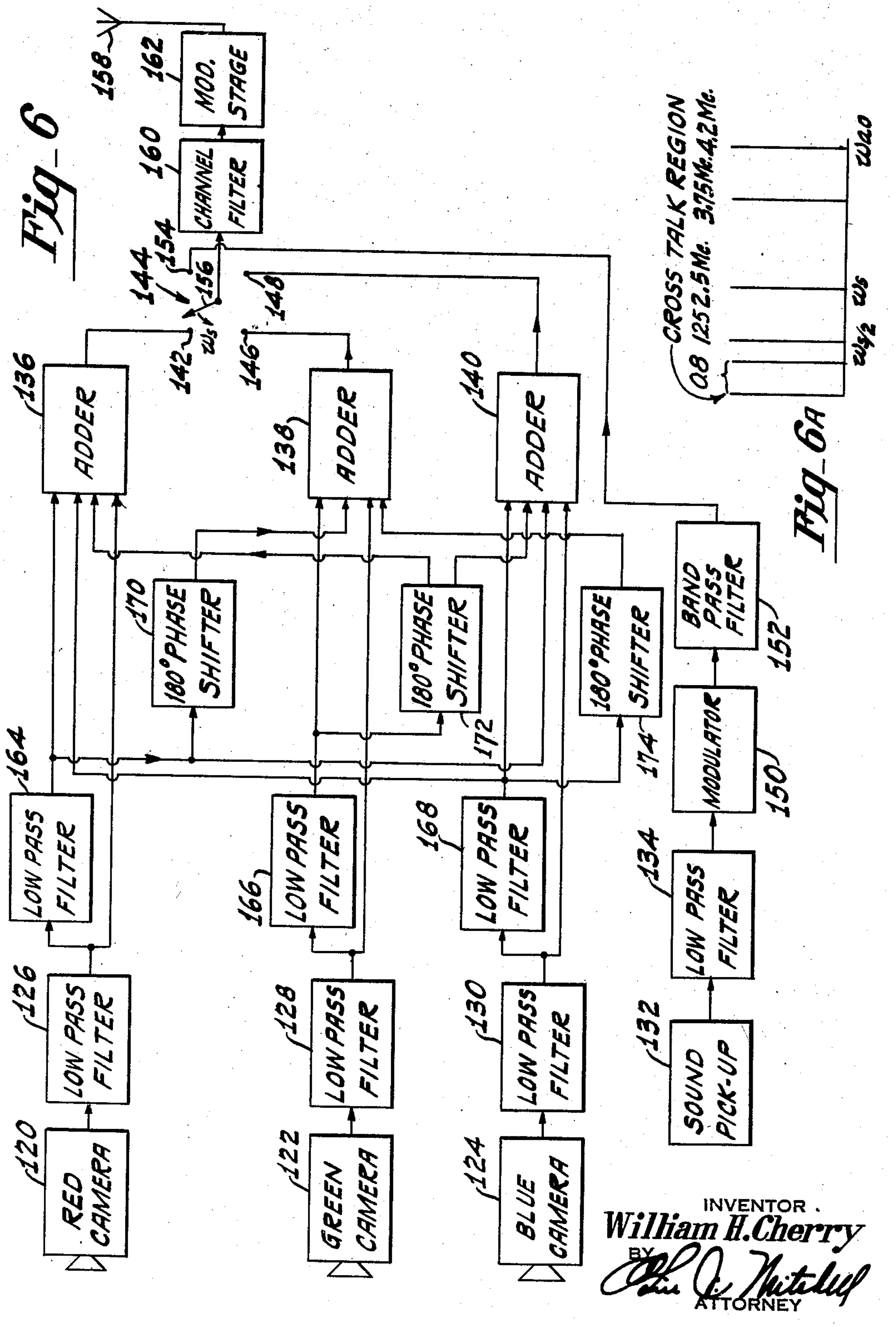

Figure 1B also illustrates graphically the relationships between various frequencies in the system when horizontal interlacing is employed;

Figure 1C illustrates in block diagram form a type of phase shifter that may be employed in the cross feeding arrangements of this invention;

Figure 2 illustrates another transmitter arrangement embodying the principles of this invention;

Figure 2A illustrates the amplitude vs. frequency characteristic of the low pass filters in the arrangement of Figure 2;

Figure 2B illustrates the amplitude vs. frequency characteristic of the bandpass filters employed in the cross feeding circuits of the arrangement shown in Figure 2;

Figure 3 illustrates a type of receiver adapted to reproduce the information conveyed by the transmitter of Figure 1 in which the horizontal interlacing principle is not employed;

Figure 4 illustrates a type of receiver that may be employed to reproduce the information conveyed in three channels by a transmitter of Figure 1 in which horizontal interlacing is employed;

Figure 5 shows a receiver embodying cross feeding arrangements that eliminate cross talk in accordance with the principles of this invention;

Figure 6 illustrates a transmitter having four channels that embodies the cross feeding principles that are the subject of this invention;

Figure 6A illustrates the relationships between various frequencies in the pass band of the transmitter of Figure 6; and Figure 7 illustrates a type of receiver adapted to reproduce the information conveyed by the four-channel transmitter of Figure 6.

Figure 8:
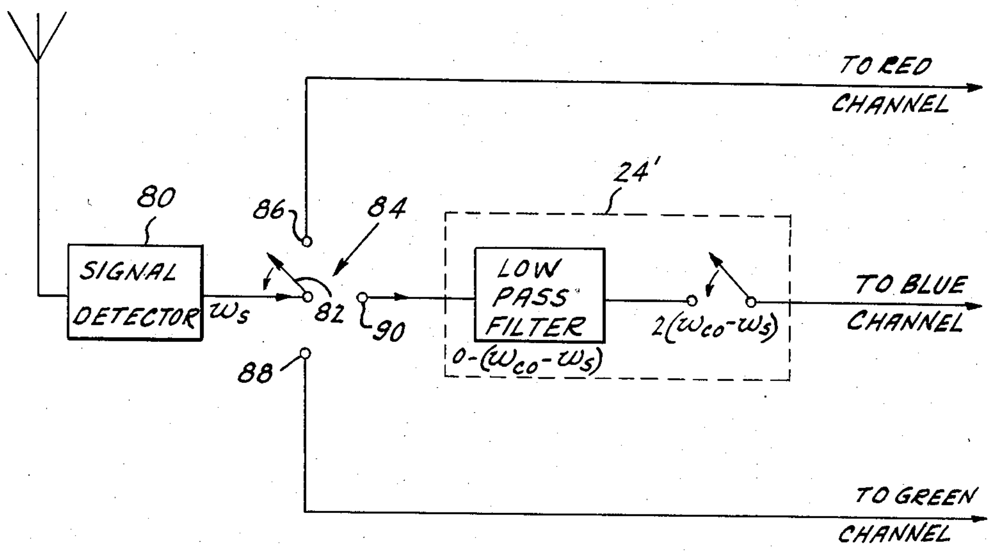

Figure 8 illustrates a type of receiver of the general form of the receiver of Figure 4 and adapted to operate in response to signals transmitted by the apparatus of Figure 1 in which horizontal interlacing of the blue video information is effected in addition to the horizontal interlacing of the red and green video information.

*The transmitter*

Figure 1 illustrates how the various aspects of this invention may be incorporated into a three-channel television transmitter. Although in this example the signal supplied to each channel of the transmitter is a video signal representing one of three different component colors, it will be understood that the signal could as well represent any type of communications information.

The video signals corresponding to the red content of the scene to be televised are supplied by camera 2. After passing through low pass filter 4 a portion of the video signals is supplied to an adder 6. The output of the low pass filter 4 is also supplied to an adder 8 via a filter 10 and a phase shifter 12 connected in series. The output of the filter 10 is also connected to the adder 6.

The video signals corresponding to the green content of the image are supplied by a pick up camera 14. After passing through a low pass filter 16 they are applied to the adder 8. The output of the low pass filter 16 is also applied to the adder 6 via a filter 18 and a phase shifter 20 connected in series. The output of the filter 18 is also connected to the adder 8.

If horizontal interlacing is employed, the upper limit of the low pass filters 4 and 16 in the red and green channels respectively may be at the cut off frequency $\omega_{co}$ of the transmitter or at the sampling rate $\omega_s$. This is the rate at which samples of any one color are transmitted. On the other hand, if horizontal interlacing is not employed, the upper limit of the low pass filters 4 and 16 should be one half the sampling frequency. The reasons for this will be made clear in the discussion of the general operation of the transmitters that is to follow.

Since the sampling operation in the transmitter is equivalent to a modulation process by a sine wave carrier without harmonics and if horizontal interlacing is not used in the red and green channels, the filters 10 and 18 should be band pass filters having frequency limits of $\omega_{co}-\omega_s$ and $$\frac{w_s}{2}$$

as indicated in Figure 1A. If, however, horizontal interlacing is employed in the red and green channels, the filters 10 and 18 will be band pass filters having frequency limits of $\omega_{co}-\omega_s$ and $2\omega_s-\omega_{co}$, as indicated in Figure 1B. On the other hand, if sufficient harmonics of the sampling frequency are present in the sampling process, the filters 10 and 18 may be high pass filters having a low frequency limit of $\omega_{co}-\omega_s$. Reasons for these differences will be made clear in the discussion of the operation that is to follow.

In the particular arrangement shown wherein three channels of information are to be transmitted, the phase shifters 12 and 20 should preferably shift the phase of frequencies presented to them by 120 degrees. These frequencies lie in the cross talk region. Phase shifter 12 should advance the phase of the signals of these frequencies by 120 degrees and phase shifter 20 should retard the phase of the signals of these frequencies by 120 degrees. For the purposes of this invention, it is desired that the phase shifters 12 and 20 operate uniformly on all frequencies within the cross talk region. Phase shifters in the form of conventional passive networks are known which can perform this function, but they may be cumbersome and expensive.

Therefore, the phase shifting apparatus of Figure 1C, to which reference now is made, is preferably employed in a transmitter. When horizontal interlacing is employed in the red and green channels, a band of frequencies is supplied by the filters 10 and 18 (Figure 1) to the phase shifters 12 and 20 (Figure 1) that lies between the frequencies $(\omega_{co}-\omega_s)$ and $(2\omega_s-\omega_{co})$. These frequencies are indicated in Figure 1B. This band of frequencies is applied to a modulator 28 wherein they are beat with a single frequency $\omega_0$, derived from a generator 29, which lies outside the band. The high pass filter 30 selects the upper side band of frequencies thus produced and applies them to a modulator 32. After the phase of the frequency $\omega_0$ has been shifted a desired amount by a single frequency phase shifter 34, it is also applied to the modulator 32. The lower side band of frequencies thus produced between zero and $(2\omega_s-\omega_{co})$ is selected by a low pass filter 36. By the action of the high pass filter 30 and the low pass filter 36 only those frequencies lying in the pass band of the filters 10 and 18 of Figure 1 will appear in the output of the low pass filter 36. This band of frequencies will have its phase shifted by the amount and direction by which the frequency $\omega_0$ is shifted in phase shifter 34. In this particular case, it is 120 degrees. The frequency $\omega_0$ supplied by the source 29 may be the sampling frequency $\omega_s$ if convenient.

The video signal corresponding to the blue content of the scene to be televised is provided by a pick up camera 22 of Figure 1 to which reference again is made. If it is desired to employ the horizontal interlacing principle so as to increase the effective amount of blue information that may be transmitted without cross talk, the output of the pick up camera 22 is supplied via apparatus within the dotted rectangle 24 to a low pass filter 26. If the horizontal interlacing principle is not to be employed, the apparatus within the dotted rectangle 24 may be omitted and the output of the pick up camera 22 connected to the output of the low pass filter 26. If, as before, the cut off frequency of the transmitter is represented by $\omega_{co}$ and the sampling frequency is represented by $\omega_s$, then the upper limit of the low pass filter 26 will be $\omega_{co}-\omega_s$.

*Horizontal interlacing in the blue channel*

The amount of information that can be sent within any frequency band is proportional to the time during which it can be sent. In horizontal interlacing a first group of samples of the blue information is sent during a horizontal line scanning interval. When this same horizontal line is scanned a second time, the phase of the sampler 40 with respect to the horizontal scanning is such that the second group of samples is interleaved with the first group of samples. The phase of sampler 40 can be adjusted with respect to the line scanning interval in various ways. The simplest way, however, is to make the sampling frequency such that its phase changes 180 degrees with respect to the line scanning interval during one line scanning interval.

The horizontal interlacing apparatus within the dotted rectangle 24 is comprised of a low pass filter 38 and a sampler 40 connected in series as shown. Any number of horizontal interlaces may be employed, but it will be assumed in the following example that double (i. e. two-to-one) horizontal interlacing is used. In that case, the upper frequency limit of the low pass filter 38 will be equal to $2(\omega_{co}-\omega_s)$. This is also the frequency of the sampler 40.

*Combining the video signals in the transmitter*

The output of the adder 6 is applied to a terminal 42 of an input second sampler 44. The output of the adder 8 is applied to a sampler input terminal 46, and the output of the low pass filter 26 is connected to a sampler input terminal 48. The sampler 44, as well as sampler 40 and others shown and subsequently to be described, preferably is of an electronic type such as shown in an article titled "A 15 by 20-Inch Projection Receiver for the RCA Color Television System," and published October 1949 by Radio Corporation of America. For purposes of simplicity, this sampler is shown as a rotary switch in which a central arm 50, representing the sampler switching element, rotates in a counter clockwise direction at a speed of $\omega_s$. The sequence with which the video information is presented to a channel filter 52 is thus red, green, blue, red, green, blue, etc. The channel filter 52 determines the cut off frequency of the transmitter. It is to be understood that the upper frequency limit may be determined by other things than a channel filter. The receiver itself may provide the bandwidth limitation. Generally speaking, the channel filter cuts off gradually, but, for purposes of simplicity, it will be assumed that the channel filter 52 cuts off immediately at $\omega_{co}$. The output of the channel filter 52 is applied to a conventional modulation stage 54.

While the use of the adders 6 and 8 of Figure 1, in combination with the phase shifters 12 and 20 is one desirable way of effecting the cross feeding of the red and green signals, the present invention is by no means restricted to the use of this type of apparatus. Other illustrative apparatus operating to produce a result corresponding to that effected by the apparatus of Figure 1 presently will be described with reference to Figure 2. First, however, in order that the desired result be clearly understood, the results produced by the apparatus of Figure 1 will be recapitulated. Assume that $\omega_{co}=4.2$ mc. and that $\omega_s=3.8$ mc. In this case, the frequency ranges (1) 0 to 0.4 mc., i. e. $[0$ to $(\omega_{co}-\omega_s)]$, and (2) 3.4 to 3.8 mc., i. e. $[(2\omega_s-\omega_{co})$ to $\omega_s]$, on the one hand and (3) 0.4 to 3.4 mc., i. e. $[(\omega_{co}-\omega_s)$ to $(2\omega_s-\omega_{co})]$, on the other hand are shifted in phase with respect to one another, preferably by 120 degrees. In addition, the signals in frequency range (3) preferably are doubled in amplitude with respect to the signals in frequency ranges (1) and (2). These phase and amplitude relationships may be produced by other types of apparatus, an example of which now will be described.

*Another transmitter arrangement*

In the arrangement of Figure 2, the upper frequency limit of the red, green and blue video signals is determined by low pass filters 47, 49 and 51 respectively. The low pass filter 51 is the same as the low pass filter 26 of Figure 1. The low pass filters 47 and 49 that are in the red and green video channels have an amplitude vs. frequency characteristic such as shown in Figure 2A. The frequencies in the cross talk region emerge from these filters with twice the amplitude of the other frequencies. If the second harmonic of the sampling frequency is present in the sampling process at the transmitter, the cross talk region extends from $\omega_{co}-\omega_s$ to $2\omega_s-\omega_{co}$. In the numerical example given above the region lies between 0.4 and 3.4 mc. When the second harmonic of the sampling frequency is not present in the sampling process this region is extended at least as far as the sampling frequency $\omega_s=3.8$ mc. in the above example. This extension is illustrated by the dotted line in Figure 2A.

The red video signals appearing at the output of the low pass filter 47 are applied to a first terminal of a sampler 53. The green video signals appearing at the output of the low pass filter 49 are applied to a second terminal of the sampler 53. The blue video signals appearing in the output of the low pass filter 51 are applied to a third terminal of the sampler 53. The red video signals are also applied to the second terminal via a circuit 55 including a band pass filter and phase shifter. Similarly, the green video signals are applied to the first terminal via a similar circuit 57 including a band pass filter and phase shifter. The output amplitude vs. frequency characteristic of the band pass filters in the circuits 55 and 57 is illustrated in Figure 2B. Examination of this figure shows that only the cross talk frequencies get through these band pass filters and that signals so passed are attenuated so that they have only one half their original amplitude. The dotted line shows the extension of the bandwidth preferred when the second harmonic of the sampling frequency is not employed. The phase shifter in the circuit 55 also advances the phase of the signals applied to it by 120 degrees, and the phase shifter in the circuit 57 retards the phase of the signals applied to it by 120 degrees. The band pass filters of the circuits 55 and 57 may assume the form shown in Figure 1C.

Because of the fifty percent attenuation of the band pass filters in the circuits 55 and 57, the green signals that are cross fed into the red channel have half the amplitude of the red signals of the same frequency. The same is true of the red signals cross fed into the green channel.

*Mixed highs*

This invention may be used in color television transmitters employing the principle of mixed highs. In such transmitters the video signals that are above an arbitrary frequency are mixed together. In effect, this mixing produces 100 percent crosstalk. Usually, this frequency lies within the cross talk region. The upper limits of the filters 10 and 13 of Figure 1 might be set at this frequency, but no difficulties arise from extending the upper limit into the mixed highs region.

*Receiver for signals not horizontally interlaced in red and green*

The receiver of Figure 3 is adapted to reproduce the red, green and blue information from signals of the type wherein the red and green signals are not horizontally interlaced. Such signals are provided by one form of the transmitter of Figures 1 and 2, as discussed above. After being derived from the transmitted signal by a conventional signal detector 60, the signals are applied to the switching element 62 of a sampler 64 operating at the sampling frequency $\omega_s$. It will be noted that the sequence of information is the same as that provided by the sampler 44 of the transmitter of Figure 1. For proper operation, it is necessary that the phase of the switching element 62 of the sampler 64 be the same as that of the switching element 50 of the sampler 44 in the transmitter. This can be done by transmitting a separate signal or in various ways, such as described in the publication "A 15 by 20-Inch Projection Receiver for the RCA Color Television System" previously referred to. However, the details of such apparatus do not form a part of this invention and therefore need not be further discussed.

In order to prevent spurious frequencies from being introduced into the red channel, a low pass filter 66 having an upper frequency limit of $$\frac{\omega_s}{2}$$

is inserted between the red channel and an output terminal 68 of the sampler 64. A similar low pass filter 70 is inserted between the green channel and an output terminal 72 of the sampler 64.

If horizontal interlacing is not employed in the blue channel of the transmitter, a third output terminal 74 of the sampler 64 is connected to the blue channel via a low pass filter 76 having an upper frequency limit of $\omega_{co}-\omega_s$. If, however, the blue information is horizontally interlaced in the transmitter by the insertion of the apparatus within the dotted rectangle 24 of Figure 1, a similar apparatus must be substituted for the low pass filter 76.

*Receiver for horizontally interlaced signals in red and green*

Figure 4 illustrates a type of receiver that may be employed to extract the red, blue and green information from a signal that is horizontally interlaced in the red and green channels by a transmitter such as one form of Figure 1 discussed above. The extension of this invention to any multiple interlacing is therefore obvious.

Such transmitted signals are derived by a conventional signal detector 80 and are applied to switching element 82 that operates at the sampling frequency $\omega_s$. The switching element 82 forms part of a sampler 84 which is similar to the sampler 64 of Figure 3, except that additional provision is made to shift the sampler phasing on successive picture scannings to secure horizontal interlacing in the well known manner. The red channel is connected directly to an output terminal 86, and the green channel to an output terminal 88. If horizontal interlacing is not employed in the blue channel at the transmitter, it is connected to an output terminal 90 of the sampler 84 via a low pass filter 92 having an upper frequency limit of $\omega_{co}-\omega_s$. If, however, the blue information is horizontally interlaced at the transmitter, it can be extracted by the substitution of apparatus such as that within the dotted rectangle 24 of Figure 1 for the filter 92. The arrangement of such a receiver is shown in Figure 8.

*General operation*

The following theoretical discussion relates to a case wherein the signal has a direct current component and a single alternating current component. The content of the wave produced by the described sampling process is limited to the direct current component, a fundamental and a second harmonic. A more rigorous discussion would take into account manifold frequencies in the signal as well as the higher harmonics of the sampling wave, but would necessitate an unnecessary multiplicity of mathematical expressions. It is not therefore the purpose of this discussion to make a rigorous proof of some of the principles embraced by this invention. Rather, it is the purpose of this discussion to aid one skilled in the art to appreciate the invention in its broadest sense.

The theoretical discussion may be outlined as follows. An expression is first determined for the green signal as a function of time. With the aid of this expression, the value of the green signal is determined for the time the red signal is sampled. This is the green cross talk in the red channel. An expression of the time function of the signal appearing in the red channel is derived, taking into consideration the cross fed signals from the green channel. This latter expression is analyzed to determine the phase shift that should be given to the green signals that are cross fed into the red channel in order that the cross talk from the green channel be zero when the red signals are being sampled.

The green video signal can be represented by the terms $G+g \sin \omega t$ wherein G is the direct current component and $g$ is the amplitude of the fundamental frequency $\omega$ of the alternating current component.

The contribution of the sampler to the output signal representative of any given color may be called the sampling wave. When any signal is keyed or sampled, the output of the keyer or sampler includes components of the keying wave. For example, if a constant direct current level of a given color is applied to a sampler, the output has an envelope having keying components. If the keying or sampling wave is a series of narrow pulses, then pulses will be combined with the video signals. Actually, this process is one of modulation in which the video signals are modulated by a keying or sampling wave.

The sampling wave may be represented by the terms $1+2 \cos \omega_s t+2 \cos 2\omega_s t$ wherein $\omega_s$ is the sampling frequency. Actually, these are the first three terms of the Fourier analysis of a series of uniformly spaced narrow pulses occurring at a rate of $\omega_s$ per second. One pulse is formed each time a sample is taken of a given signal. The terms frequency and angular frequency are used indiscriminately since no ambiguities are likely to arise.

Because the sampling process is actually one of modulation, the resulting green video signals can be determined by the following multiplication.

(1)

$$(G+g \sin \omega t)(1+2 \cos \omega_s t+2 \cos 2\omega_s t) \\ =G(1+2 \cos \omega_s t+2 \cos 2\omega_s t)+g \sin \omega t \\ +g \sin (\omega t-\omega_s t)+g \sin (\omega t+\omega_s t) \\ +g \sin (\omega t+2\omega_s t)+g \sin (\omega t-2\omega_s t)$$

In a practical case, the sampling frequency is generally so high that certain of the terms in the above expression represent frequencies above the cut off frequency of the transmitter. Under such circumstances, the expression for the green signal as a function of time is—

(2)

$$G(1+2 \cos \omega_s t)+g \sin \omega t+g \sin (\omega t-\omega_s t) \\ +g \sin (\omega t+\omega_s t)+g \sin (\omega t-2\omega_s t)$$

It will be apparent that the first three terms of the above expression will be transmitted for all values of $\omega$ and $\omega_s$ that are less than $\omega_{co}$, the cut off frequency of the transmitter. Whether the fourth and fifth terms of the above expression are present depends on the relationship between the sampling frequency $\omega_s$, the cut off frequency $\omega_{co}$, and the signal frequency $\omega$. For convenience, these frequencies have been given actual values, as indicated in Figure 1B. The sampling frequency $\omega_s$ is 3.8 mc., and the cutoff frequency $\omega_{co}$ is 4.2 mc.

When the signal frequency $\omega$ is less than 0.4 mc. or $(\omega_{co}-\omega_s)$ the fifth term of Expression 2 will represent an alternating component having a frequency greater than $\omega_{co}$ so that it will not appear in the transmitted wave. For example (if $\omega$ equals 0.1 mc., $g \sin (\omega t-2\omega_s t) =g \sin 2\pi(0.1-2\times 3.8)t=g \sin 2\pi(7.5)t$.

When $\omega$ is between $\omega_{co}-\omega_s$ and $2\omega_s-\omega_{co}$ or between 0.4 mc. and 3.4 mc., the fourth and fifth terms drop out. For example, if $\omega$ is 3 mc., the fourth term has a frequency of $\omega+\omega_s=3+3.8=6.8$ mc., a frequency that is beyond the cut off frequency of 4.2 mc. When $\omega=3$ mc. the fifth term has a frequency of $3-7.6=-4.6$ mc. Here again, the frequency is greater than $\omega_{co}=4.2$ mc. and so is not transmitted.

Between the signal frequencies of $2\omega_s-\omega_{co}$ and $\omega_s$ or 3.4 mc. and 3.8 mc., the fourth term of the Expression 2 drops out. For example, if $\omega=3.6$, the $\omega+\omega_s=3.6+3.8=7.4$ mc. The fifth term remains since $\omega-2\omega_s=3.6-7.6=4.0$ mc., a frequency within the cut off frequency of 4.2 mc.

This analysis applied equally to the case such as illustrated by Figure 1B wherein horizontal interlacing is employed as to a case such as Figure 1A where horizontal interlacing is not used. The only difference is that in the first case signals above $\omega_s/2$ are cut off by the filters 4 and 16, as explained in connection with Figure 1.

*Determination of cross talk*

The amount of cross talk in the transmitted signal can be determined by examining the green signal at a time when the red signal is being sampled. Assuming that the green signal is sampled at a time $t'$ when $\omega_s t=0$ degrees, then red is sampled when $\omega_s t=-120$ degrees. The value of the green signal at this time $t'$ is found by substitution of $t'$ in Expression 2 to be—

(3)

$$G(1+2 \cos -120°)+g \sin \omega t'+g \sin (\omega t'+120°) \\ +g \sin (\omega t'-120°)+g \sin (\omega t'+240°)=$$

(4)

$$g \sin \omega t'+g \sin (\omega t'+120°)+g \sin (\omega t'-120°)+g \sin (\omega t'+240°)$$

For frequencies outside the region between $(\omega_{co}-\omega_s)$ and $(2\omega_s-\omega_{co})$, or between 0.4 mc. and 3.4 mc. in the above example either the third or the fourth term of the Expression 4 is missing. Thus, outside of this crosstalk region three sine wave components are present. They may be represented by three vectors of equal length spaced by 120 degrees. The resultant of these vectors is therefore 0 and the value of the green signal at the time the red is being sampled is 0. This means that no cross talk is introduced into the red channel for these green signal frequencies.

The situation is quite different for green signal frequencies lying in the range between 0.4 mc. and 3.4 mc. In this range it was pointed out above that neither the fourth or fifth terms of the Expression 2 are present. The green signal is therefor e represented by the expression (5) $$G(1+2 \cos \omega_s t)+g \sin \omega t+g \sin (\omega t-\omega_s t)$$

At $t=t'$ this becomes (the cos of $\omega_s t=\cos 120°=-\frac{1}{2}$)

(6) $$g \sin \omega t'+g \sin (\omega t'+120°)$$

Expression 6 represents only two equally long vectors separated by 120 degrees. The resultant of these is therefore the cross talk of the green in the red channel.

It has been stated above that the most desirable type of sampling is that having a Fourier analysis yielding the expression $$1+2 \cos \omega_s t+2 \cos 2\omega_s t+ \ldots$$

One of the reasons for this is the fact that the D. C. term of one signal goes to zero when a sample of another signal is taken 120 degrees later. This is indicated by a comparison of the Expressions 5 and 6 above. It is not intended that this invention be limited to the sampling of this type because the cross feeding principles herein employed are useful even when the sampling is not done in this manner. In fact, it may be possible to correct for improper sampling at the transmitter by employing a different form of sampling at the receiver, and vice versa. The overall result could then be made the same as that achieved when using the idealized type of sampling noted above.

From a different point of view it can be said that cross talk appears in a three channel multiplex system for any signal frequency that does not produce three side bands within the cut off frequency $\omega_{co}$ or pass band of the transmitter. This, of course, is only true where three separate signals are being sent. Each one of the terms in the above expression is in effect a side band. When only two terms were present as in the Expression 6, only two transmittable side bands were formed and cross talk among the three signals is unavoidable.

In accordance with one aspect of this invention, some of the green signal is cross fed to the red channel. In the transmitter of Figure 1 this is done before the sampling operation is performed. Only those frequencies lying within the cross talk region are so treated. It remains to determine the proper value of the phase shift to be given the cross fed signals. This can be done by examining a single frequency within the cross talk region. Such a signal can be represented by the expression $g \sin (\omega t+\theta)$ where $\omega$ is its frequency and $\theta$ the amount of phase change that takes place while the switching element 56 of sampler 44 of Figure 1 goes from red terminal 42 to green terminal 46. When this signal is applied to the sampler via the red channel, the sampler has changed by 120 degrees. Therefore, the signal cross fed into the red channel appears at the output of the sampler as (7) $$g \sin (\omega t+\theta)[1+2 \cos (\omega_s t+120°)+2 \cos (2\omega_s t+240°)]=$$

(8) $$g \sin (\omega t+\theta)+2g \sin (\omega t+\theta) \cos (\omega_s t+120°)+2g \sin (\omega t+\theta) \cos (2\omega_s t+240°)=$$

(9) $g\sin(\omega t+\theta)+g\sin(\omega t+\theta-\omega_s t-120°)+g\sin(\omega t+\theta+\omega_s t+120°)+g\sin(\omega t+\theta+2\omega_s t+240°)+g\sin(\omega t+\theta-2\omega_s t-240°)$ However, as before, $\omega+2\omega_s$ is beyond $\omega_{co}$ and cannot be transmitted. The values of $\omega$ that are cross fed all lie in the cross talk region and therefore $\omega+\omega_s$ and $\omega-2\omega_s$ also lie beyond the cut off frequency $\omega_{co}$. Therefore, the value of the cross fed green signal occurring at the output of the sampler when red is being sampled becomes

(10) $g\sin(\omega t'+\theta)+g\sin(\omega t'+\theta-\omega_s t'-120°)$

If $\omega_s t=-120°$ then Expression 10 becomes

(11) $2g\sin(\omega t'+\theta)$

By inspection, if the cross fed signals are reduced by one half and $\theta=-120°$ the Expression 11 becomes

(12) $g\sin(\omega t'-120°)$

If the cross fed green signal (12) is combined with the cross talk from the green as represented by the Expression 6 the result is

(13) $g\sin\omega t'+g\sin(\omega t'+120°)+g\sin(\omega t'-120°)$

The transmitted green signal is therefore zero in the cross talk region during the time red is being sampled. Therefore, when red is being sampled at the receiver no cross talk from the green signal is present.

In the cross talk region the green signals fed to the red channel must be one half these same frequencies of red signal and vice versa. It will be noted that the red signals in the cross talk region are fed to the adder 6 directly from the filter 4 and again from the filter 10. This doubles the amplitude of the red signals in the cross talk region with respect to the cross fed green signals in this region because the latter come only from the filter 18.

*Cross feeding at the receiver*

It has been previously stated that the cross feed of the green channel into the red and vice versa may be done after sampling at the receiver. In Figure 5 such a receiver is illustrated. For convenience, those parts of the receiver that are similar to the transmitter of Figure 1 will be indicated by similar numbers primed. The transmitted signal is detected by any conventional signal detecting apparatus 100 and applied to the switching element 102 of a sampler 104. The element 102 is kept in phase synchronism with the corresponding element 50 of the sampler 44 in the transmitter of Figure 1 by any conventional means, as previously discussed. In the analogy to the transmitter of Figure 1, an output terminal 106 of the sampler 104 corresponds to the output of the low pass filter 4 of Figure 1. In a similar way, the output terminals 108 and 110 correspond to the outputs of the low pass filter 16 and the blue camera 22, respectively. Instead of being fed to a sampler, as in Figure 1, the outputs of the adders 6' and 8' are supplied to red and green channels which preferably include means for reproducing the red and green images respectively. Likewise, the output of the low pass filter 26' is supplied to the blue channel.

If it is desired to make the cross talk correction at the receiver and employ the horizontal interlacing principle in red and green, wide pulse samplers should preferably be inserted in the red and green channels. These samplers would operate at a frequency and phase of the sampler 104. In this way, the information presented to the red and green image reproducers on one field would be horizontally interlaced with the information produced by these reproducers on another field. If it is desired to employ the horizontal interlacing principle in the blue channel, this can be accomplished by the substitution for the low pass filter 26' of a low pass filter and a wide pulse sampler, as indicated within the dotted rectangle of Figure 1.

In the previous discussion, the cross feeding of the signals in the red and green channels has been done entirely at the trasnmitter or entirely at the receiver. However, it would be possible to perform the cross feeding of the green into the red channels at the transmitter and of the red into the green channel at the receiver or vice versa. It is believed that such a combination between the transmitter and receiver need not be illustrated. Such an arrangement could be arrived at by simply omitting the one cross feed circuit in the transmitter of Figure 1 and the other cross feed circuit in a receiver such as that of Figure 5. Whether the cross feeding is done entirely at the receiver or partly at the transmitter and partly at the receiver, the theory of operation is similar to that described above.

*Four channel transmitter*

As the invention has been described, it has been embodied in a system employing only three channels. The following discussion relates to the application of certain aspects of the principles of the invention to a four channel system. It is to be understood that the generic concepts of the invention may be applied to systems employing even more channels. A four channel transmitter is illustrated in Figure 6. The horizontal interlacing principle can be applied to this apparatus, but for the sake of simplicity, it will not be discussed in connection therewith.

Assume for example, that the pass band of the transmitter is still limited to 4.2 mc., and that the sampling frequency $\omega_s$ is 2.5 mc. The video signals provided by a red camera 120, a green camera 122, and a blue camera 124 will be passed through low pass filters 126, 128 and 130, each having an upper frequency limit of 1.25 mc. In this arrangement the fourth channel is employed to transmit audio information such as derived from a sound pick-up device 132. This information is limited to a bandwidth of .45 mc., by filter 134. It may consist of direct audio signal, a carrier that is modulated frequency wise, or amplitude wise, or otherwise by audio, or other form of audio information.

The red signal supplied by the low pass filter 126 is coupled to an adder 136. The green signal provided by the low pass filter 128 is coupled to an adder 138. The blue signal provided by the low pass filter 130 is coupled directly to an adder 140. The output of the adder 136 is connected to an input terminal 142 of the sampler 144. The output of the adder 138 is connected to a terminal 146 of the sampler 144, and the output of the adder 140 is connected to a terminal 148 of the sampler 144.

The signal in the channel having the smallest bandwidth (i. e., corresponding to the blue channel of Figure 1) is derived in a somewhat different manner than that used in Figure 1 in order that it may be transmitted in a cross talk free region. In the previous examples, this region has been immediately above the zero frequency. However, in this four channel system the cross talk free region is between .8 mc. and 1.25 mc., as illustrated in Figure 6A. Therefore, the audio signal provided by the low pass filter 134 is modulated with a .8 mc. signal in a modulator 150. The audio video signal thus appears in a band lying within .8 mc. and 1.25 mc., which, as noted above, is a cross talk free region. The output of the modulator 150 is passed through a band pass filter 152 having a lower frequency limit of .8 mc. and an upper frequency limit of 1.25 mc. The output of the band pass filter 152 is connected to a fourth input terminal 154 of the sampler 144.

The switching element 156 of the sampler 144 is operated at a sampling frequency of 2.5 mc. In this way, a sample of each of the signals applied to the input terminals 142, 146, 148 and 154 of the sampler 144 are supplied to the output of the sampler 144 at a rate of 2.5 million a second. The switching element 156 of the sampler 144 is connected to an antenna 158 via channel filter 160 and a modulation stage 162 in accordance with well known practice. As discussed in connection with previous figures, the sampler 144 may assume any well known form whether or not that form produces a sharp or wide sample.

*Cross feed in a four channel system*

The cross feed circuits of the arrangement shown in Figure 6 will now be discussed. The red video signals appearing in the output of the low pass filter 126 are applied to another low pass filter 164 having an upper frequency limit of .8 mc. In a similar way, the green video signals are applied to a low pass filter 166 and the blue signals are applied to a low pass filter 168. The red video signals appearing in the output of the low pass filter 164 are conducted to the adder 136 and the adder 140. These same signals are shifted by 180 degrees in a phase shifter 170 and applied to the adder 138. The green video signals appearing in the output of the low pass filter 166 are connected to the adder 138 and to the adders 136 and 140 via a 180-degree phase shifter 172. The blue video signals appearing in the output of the low pass filter 168 are connected directly to the adder 136 and to the adder 140. They are also connected to the adder 138 via a 180-degree phase shifter 174.

*Four channel receiver*

Figure 7 illustrates a receiver adapted to reproduce the information conveyed by the transmitter of Figure 6. After being detected by any suitable means known to those skilled in the art, the modulation appearing on the carrier wave is applied to a switching element 180 of a sampler 182. The phase and frequency of this element with respect to the output terminals of the sampler is the same as the phase and frequency of the switching element 156 in the sampler 144 of Figure 6. As noted in the discussions concerning Figure 3, the control of this phase and frequency can be obtained by various means.

The channel that is adapted to reproduce the red portion of the image is connected to an output terminal 184 of the sampler 182 via a low pass filter 186 having an upper frequency limit of 1.25 mc. In a similar fashion, the green image reproducing channel is connected to the sampler output terminal 187, and the blue reproducing channel is connected to the sampler output terminal 188.

It will be remembered, however, that the audio information was heretodyned up to the cross talk free region lying between .8 mc. and 1.25 mc. Therefore, after this band of frequencies has been selected by a band pass filter 190 from the signals appearing at an output terminal 191 of the sampler 182, it is supplied to a modulator 192. The original audio frequency is recovered after the output of the modulator 192 is passed through a low pass filter 194 having an upper frequency limit of .45 mc.

A theoretical explanation of the four channel apparatus described above is not believed necessary. However, the following simultaneous equations indicate the relationships between the red, green and blue information that must be present in each of these channels in order that cross talk be eliminated in them.

$$\tfrac{3}{4}r+\tfrac{1}{4}g-\tfrac{1}{4}b=R$$

$$\tfrac{1}{4}r+\tfrac{3}{4}g+\tfrac{1}{4}b=G$$

$$-\tfrac{1}{4}r+\tfrac{1}{4}g+\tfrac{3}{4}b=B$$

$$r\sim 2R+B-G;\ g\sim 2G-R-B;\ b\sim 2B+R-G$$

The small letters represent the signals present at the sampler and the capital letters represent the video signals supplied by the cameras.

Having described my invention, what is claimed is:

1. A transmitter comprising in combination a first source of signals, a second source of signals, and a third source of signals, a sampler having a first input terminal, a second input terminal and a third input terminal, means for applying signals from said first source that lie within a predetermined region of frequencies to said first terminal at a predetermined amplitude and for applying frequencies from the first source that lie outside this region to said first terminal at one half the predetermined amplitude, means for applying signal frequencies from said first source that lie within said frequency region to said second terminal at one half said predetermined amplitude with a phase advance, means for applying signals from said second source that have a frequency within said predetermined region to said second terminal at a predetermined amplitude and signals from said second source that lie outside said frequency region to said second terminal at one half said predetermined amplitude, means for applying signals from said second source that lie within said predetermined region to said first terminal at one half said predetermined amplitude with a phase lag, a low pass filter the upper frequency limit of which is the lower limit of said predetermined region, said filter being connected between said third source and said third terminal.

2. A transmitter comprising in combination a first source of signals, a second source of signals and a third source of signals, a first adder, a second adder, connections between said first source and said first adder, a first band pass filter and a first phase shifter connected in series between said first source and said second adder, connections between the output of said first band pass filter and said first adder, connections between the output of said second source and said second adder, a second band pass filter and a second phase shifter connected in series between said second source and said first adder, connections between the output of said second band pass filter and said second adder, a sampler having three input circuits and one output circuit, a low pass filter connected between said third source and one of said input circuits, the output circuit of said first adder being applied to another of said input circuits, and the output circuit of said second adder being connected to the third input circuit.

3. A transmitter comprising in combination a first source of signals, a second source of signals and a third source of signals, a first adder, a second adder, connections between the output of said first source and said first adder, a first band pass filter and a first phase shifter connected in series between said first source and said second adder, connections between the output of said first band pass filter and said first adder, connections between the output of said second source and said second adder, a second band pass filter and a second phase shifter connected in series between said second source and said first adder, connections between the output of said second band pass filter and said second adder, a first sampler having three inputs and one output, a first low pass filter, a second sampler, and a second low pass filter connected in series between said third source and one of said inputs, the output of said first adder being applied to another of said inputs and the output of said second adder being connected to the third input.

4. A receiver comprising in combination means for detecting a signal, said detecting means having an output circuit, a first sampler having an input circuit and three output circuits, the output circuit of said detecting means being electrically connected to said input circuit, a first circuit connected to a first output circuit of said first sampler, a second circuit connected to the second output circuit of said first sampler, a second sampler, a low pass filter, and a third circuit connected in series, the third output circuit of said first sampler being connected to said second sampler.

5. A transmitter comprising in combination a first source of signals and a first low pass filter connected in series, a second source of signals and a second low pass filter connected in series, a third source of signals and a third low pass filter connected in series, a first adder and a second adder, the output of said first low pass filter being applied to said first adder, a first band pass filter and a first phase shifter connected in series in the order named between the output of said first low pass filter and said second adder, the output of said first band pass filter being connected to said first adder, a second band pass filter and a second phase shifter connected in series in the order named between the output of said second low pass filter and said first adder, the output of said second band pass filter being applied to said second adder, a sampler, the outputs of said first and second adders and said third low pass filter being applied to said sampler.

6. A receiver comprising in combination means for detecting a transmitted signal, a first sampler having an input circuit and a plurality of output circuits, said input circuit being connected so as to receive the output of said signal detecting means, a first channel connected to one of said first sampler output circuits, a second channel connected to another of said first sampler output circuits, a first low pass filter connected to a third one of said first sampler output circuits, a second sampler connected so as to receive the output of said first low pass filter, and a second low pass filter connected so as to receive the output of said second sampler.

7. A transmitter comprising in combination a first source of signals and a first low pass filter connected in series, a second source of signals and a second low pass filter connected in series and a third source of signals and a third low pass filter connected in series, a first adder and a second adder, the output of said first low pass filter being connected to said first adder, a first high pass filter and a first phase shifter connected in series and in the order named between the output of said first low pass filter and said second adder, the output of said first high pass filter being connected to said first adder, connections between the output of said second low pass filter and said second adder, a second high pass filter and a second phase shifter connected in series and in the order named between said second low pass filter and said first adder, the output of said second high pass filter being connected to said second adder, a sampler connected so as to receive the outputs of said first and second adders and said third low pass filter.

8. A transmitter such as described in claim 7 in which a low pass filter, a sampler and another low pass filter are connected in series between the third source and the first mentioned sampler.

9. A transmitter comprising in combination a sampler having three inputs and a single output operating at a frequency $\omega_s$, a channel filter having a cut off frequency $\omega_{co}$ that is greater than $\omega_s$, the output of said sampler being applied to said channel filter, a first source of signals that may have frequencies at least as high as $\omega_s$, a first adder connected to receive the output of said first source, a second source of signals that may have a frequency at least as high as $\omega_s$, a first band pass filter and a first phase shifter connected in series between said second source and said first adder, the frequency band of said band pass filter lying within the range $(\omega_{co}-\omega_s)$ to $(2\omega_s-\omega_{co})$, a second adder, the output of said second source being applied to said second adder, a second band pass filter and a second phase shifter connected in series between said first source and said second adder, the frequency band of said second band pass filter lying within the range $(\omega_{co}-\omega_s)$ to $(2\omega_s-\omega_{co})$, connections between the output of said second band pass filter and said first adder and between the output of said first band pass filter and said second adder, a third source of signals that may go to frequencies at least as high as $(\omega_{co}-\omega_s)$, connections between one of the inputs of said sampler and the output of said first adder, connections between another of the inputs of said sampler and said second adder, and connections between still another input of said sampler and said third source of signals.

10. A multiplex communication system including a communication channel having a given bandwidth, a plurality of signal channels having an aggregate bandwidth greater than said given bandwidth, and multiplexing means for effectively impressing signal samples from said signal channels upon said communication channel, means for limiting one of said signal channels to less than its proportionate share of bandwidth, the cyclic rate of said multiplexing means being such that a region free of cross talk is provided, the signals of said one channel occupying a frequency range within said region and means for reducing cross talk from those portions of the signals in the channels having wider bandwidths which lie outside said region.

11. Signalling apparatus for conveying signal information representing a plurality of separate signal components comprising in combination, a plurality of signal channels, means for time division multiplexing components of said plurality of said separate signal components having frequencies up to and including predetermined frequency in said plurality of signal channels, means limiting one of said plurality of said separate signal components to signal frequencies lower than said predetermined frequency, and means for time division multiplexing components of said plurality of said separate signal components having frequencies higher than said predetermined frequency in a number of said signal channels less than the number of said plurality of signal channels.

12. A signalling system comprising in combination, a first source of signals, a second source of signals and a third source of signals, a first adder, a second adder, connections between said first source and said first adder, a first band pass filter and a first phase shifter connected in series between said first source and said second adder, connections between the output of said first band pass filter and said first adder, connections between the output of said second source and said second adder, a second band pass filter and a second phase shifter connected in series between said second source and said first adder, connections between the output of said second band pass filter and said second adder, a sampler having three input circuits and one output circuit, a first low pass filter connected between said third source and one of said input circuits, the output circuit of said first adder being applied to another of said input circuits, and the output circuit of said second adder being connected to the third input circuit, means transmitting and receiving a signal from said sampler output circuit, means for detecting said transmitted signal, said detecting means having an output circuit, a distributor having an input circuit and three output circuits, the output circuit of said detecting means being electrically connected to said distributor input circuit, a first signal channel connected to a first output circuit of said distributor, a second signal channel connected to the second output circuit of said distributor, and a third signal channel including a second low pass filter connected to the third output circuit distributor.

13. A signalling system comprising in combination, a first source of signals, a second source of signals and a third source of signals, a first adder, a second adder, connections between the output of said first source and said first adder, a first band pass filter and a first phase shifter connected serially between said first source and said second adder, connections between the output of said first band pass filter and said first adder, connections between the output of said second source and said second adder, a second band pass filter and a second phase shifter connected in series between said second source and said first adder, connections between the output of said second band pass and said second adder, a first sampler having three inputs and one output, a first low pass filter, a second sampler, and a second low pass filter connected in series between said third source and one of said first sampler inputs, the output of said first adder being applied to another of said first sampler inputs and the output of said second adder being connected to the third input, means transmitting and receiving a signal from said first sampler output, means for detecting said transmitted signal, said detecting means having an output circuit, a third sampler having an input circuit and three output circuits, the output circuit of said detecting means being electrically connected to said third sampler input circuit, a first signal channel connected to a first output circuit of said third sampler, a second signal channel connected to the second output circuit of said third sampler, and a fourth sampler, a third low pass filter, and a third signal channel connected to the third output circuit of said third sampler.

14. A signalling system comprising in combination a first source of signals and a first low pass filter connected in series, a second source of signals and a second low pass filter connected in series, a third source of signals and a third low pass filter connected in series, a first adder and a second adder, the output of said first low pass filter being applied to said first adder, a first band pass filter and a first phase shifter connected in series in the order named between the output of said first low pass filter and said second adder, the output of said first band pass filter being connected to said first adder, a second band pass filter and a second phase shifter connected in series in the order named between the output of said second low pass filter and said first adder, the output of said second band pass filter being applied to said second adder, a first sampler, the outputs of said first and second adders and said third low pass filter being applied to said first sampler, means transmitting and receiving a signal from said first sampler, means for detecting said transmitted signal, a second sampler having a plurality of outputs connected so as to receive the output of said detecting means, a first signal channel connected to one of said second sampler outputs, a second signal channel connected to another of said second sampler outputs, and a fourth low pass filter connected to a third output of said second sampler.

15. A color television transmitter for transmitting, in a channel having a finite band width, a composite signal representative of a plurality of colors of an object, said transmitter including in combination: means to derive three video signals respectively representing three different colors of an object; sampling means to multiplex said video signals at a rate sufficiently high to produce a cross-talk region for video signals above a given frequency; means to apply said video signals to said sampling means so that the multiplexed signal produced in the output of said sampling means represents information relative to said three object colors outside of the cross-talk region; means to cross-feed said video signals having frequencies above said given frequency; and means to apply said cross-fed video signals to said sampling means so that the multiplexed signal produced in the output of said sampling means represents information relative to no more than two of said object colors in the cross-talk region, thereby to reduce distortion.

16. A transmitter comprising in combination: a channel filter having a given upper cutoff frequency substantially equal to the highest frequency to be transmitted; first, second and third sources of signals; means to limit the signals derived from said first and second sources to a maximum frequency equal to a given sampling frequency, said sampling frequency being lower than said cutoff frequency; first and second adders; means impressing said frequency-limited signals derived from said first signal source upon said first adder; means including a first bandpass filter and a first phase shifter connected in series between said first signal source and said second adder, said first bandpass filter being capable of passing frequencies in the range between a frequency corresponding to the difference between said cutoff and said sampling frequencies and a frequency corresponding to the difference between twice said sampling frequency and said cutoff frequency, said first phase shifter being adapted to shift the phase of signals lying within the pass band of said first bandpass filter by approximately +120°; means connecting the output of said first bandpass filter to said first adder; means connecting the output of said second signal source to said second adder; means including a second bandpass filter and a second phase shifter connected in series between said second signal source and said first adder, said second bandpass filter being capable of passing frequencies in the range between a frequency corresponding to the difference between said cutoff and said sampling frequencies and a frequency corresponding to the difference between twice said sampling frequency and said cutoff frequency, said second phase shifter being adapted to shift the phase of signals lying within the pass band of said second bandpass filter by approximately −120°; means connecting the output of said second bandpass filter to said second adder; a sampler having three input circuits and one output circuit and adapted to be operated at said sampling frequency; means to operate said sampler in such a manner as to sample the output of said second adder immediately following its sampling of the output of said first adder; a low pass filter having an upper frequency corresponding to the difference between said cutoff and said sampling frequencies connected between said third signal source and one of said sampler input circuits; means connecting the output circuit of said first adder to another one of said sampler input circuits; means connecting the output circuit of said second adder to said third sampler input circuit; and means connecting said sampler output circuit to said channel filter.

17. A transmitter comprising in combination: a channel filter having a given upper cutoff frequency substantially equal to the highest frequency to be transmitted; first, second and third sources of signals; means to limit the signals derived from said first and second sources to a maximum frequency equal to a first given sampling frequency, said first sampling frequency being lower than said cutoff frequency; first and second adders; means impressing said frequency-limited signals derived from said first signal source upon said first adder; means including a first bandpass filter and a first phase shifter connected in series between said first signal source and said second adder, said first bandpass filter being capable of passing frequencies in the range between a frequency corresponding to the difference between said cutoff and said first sampling frequencies and a frequency corresponding to the difference between twice said first sampling frequency and said cutoff frequency, said first phase shifter being adapted to shift the phase of signals lying within the pass band of said first bandpass filter by approximately +120°; means connecting the output of said first bandpass filter to said first adder; means connecting the output of said second signal source to said second adder; means including a second bandpass filter and a second phase shifter connected in series between said second signal source and said first adder, said second bandpass filter being capable of passing frequencies in the range between a frequency corresponding to the difference between said cutoff and said first sampling frequencies and a frequency corresponding to the difference between twice said first sampling frequency and said cutoff frequency, said second phase shifter being adapted to shift the phase of signals lying within the pass band of said second bandpass filter by approximately −120°; means connecting the output of said second bandpass filter to said second adder; a first sampler having three input circuits and one output circuit and adapted to be operated at said first sampling frequency; means to operate said first sampler in such a manner as to sample the output of said second adder immediately following its sampling of the output of said first adder; a first low pass filter having an upper frequency corresponding to the difference between said cutoff and said first sampling frequencies connected between said third signal source and one of said first sampler input circuits; means connecting the output circuit of said first adder to another one of said first sampler input circuits; means connecting the output circuit of said second adder to the third one of said first sampler input circuits; a second sampler and a second low pass filter connected in series in the order named between said third signal sourse and said first low pass filter, said second sampler adapted to be operated at a frequency corresponding to twice the difference between said cutoff and said first sampling frequencies, and said second low pass filter having a frequency corresponding to the operating frequency of said second sampler; and means connecting said first sampler output circuit to said channel filter.

18. A receiver comprising in combination: means having a frequency response no higher than a given cutoff frequency for detecting a signal, said detecting means having an output circuit; a first sampler having an input circuit and three output circuits, the output circuit of said detecting means being electrically connected to said first sampler input circuit; means to operate said first sampler at a given sampling frequency, said sampling frequency being lower than said cutoff frequency; a first circuit connected to a first output circuit of said first sampler; a second circuit connected to a second output circuit of said first sampler; a second sampler, a low pass filter and a third circuit connected in series, said low pass filter having an upper frequency corresponding to approximately twice the difference between said cutoff and said sampling frequencies; means connecting said second sampler to the third output circuit of said first sampler; and means to operate said second sampler at a frequency corresponding to approximately twice the difference between said cutoff and said sampling frequencies.

19. A transmitter comprising in combination: a channel filter having a given upper cut-off frequency substantially equal to the highest frequency to be transmitted; a first series connection of a first source of signals and a first low pass filter, said first low pass filter having an upper frequency corresponding to one-half of a given sampling frequency, said sampling frequency being lower than said cut-off frequency; a second series connection of a second source of signals and a second low pass filter, said second low pass filter having an upper frequency corresponding to one-half of said sampling frequency; a third series connection of a third source of signals and a third low pass filter, said third low pass filter having an upper frequency corresponding to the difference between said cut-off and said sampling frequencies; a first adder and a second adder; means connecting the output of said first low pass filter to said first adder; a first bandpass filter and a first phase shifter connected in series in the order named between the output of said first low pass filter and said second adder, said first bandpass filter being capable of passing frequencies in the range between a frequency corresponding to the difference between said cut-off and said sampling frequencies and a frequency corresponding to one-half of said sampling frequency, said first phase shifter being adapted to shift the phase of signals lying within the pass band of said first bandpass filter by approximately +120 degrees; means connecting the output of said first bandpass filter to said first adder; a second bandpass filter and a second phase shifter connected in series in the order named between the output of said second low pass filter and said first adder, said second bandpass filter being capable of passing frequencies in the range between a frequency corresponding to the difference between said cut-off and said sampling frequencies and a frequency corresponding to one-half of said sampling frequency, said second phase shifter being adapted to shift the phase of signals lying within the pass band of said second band pass filter by approximately −120 degrees; means connecting the output of said second bandpass filter to said second adder; a sampler having three input circuits and one output circuit and adapted to be operated at said sampling frequency; means connecting the outputs of said first and second adders and said third low pass filter respectively to the three input circuits of said sampler; and means connecting the output circuit of said sampler to said channel filter.

20. A receiver comprising in combination: means having a frequency response no higher than a given cut-off frequency for detecting a signal; a first sampler having an input circuit and a plurality of output circuits, said input circuit being connected so as to receive the output of said signal detecting means; means to operate said first sampler at a given sampling frequency, said sampling frequency being lower than said cut-off frequency; a first channel connected to one of said first sampler output circuits; a second channel connected to another one of said first sampler output circuits; a first low pass filter connected to a third one of said first sampler output circuits, the upper frequency of said first low pass filter corresponding to the difference between said cut-off and said sampling frequencies; a second sampler connected so as to receive the output of said first low pass filter; and a second low pass filter connected so as to receive the output of said second sampler, the upper frequency of said second low pass filter being twice the difference between said cut-off and said sampling frequencies.

21. A transmitter comprising in combination: a channel filter having a given upper cut-off frequency substantially equal to the highest frequency to be transmitted; a first series connection of a first source of signals and a first low pass filter, said first low pass filter having an upper frequency corresponding to one-half of a given sampling frequency, said sampling frequency being lower than said cut-off frequency; a second series connection of a second source of signals and a second low pass filter, said second low pass filter having an upper frequency corresponding to one-half of said sampling frequency; a third series connection of a third source of signals and a third low pass filter, said third low pass filter having an upper frequency corresponding to the difference between said cut-off and said sampling frequencies; a first adder and a second adder; means connecting the output of said first low pass filter to said first adder; a first high pass filter and a first phase shifter connected in series and in the order named between the output of said first low pass filter and said second adder, said first high pass filter having a lower frequency corresponding to the difference between said cut-off and said sampling frequencies, said first phase shifter being adapted to advance the phase of signals lying within the pass band of said first bandpass filter by 120 degrees; means connecting the output of said first high pass filter to said first adder; means connecting the output of said second low pass filter to said second adder; a second high pass filter and a second phase shifter connected in series and in the order named between said second low pass filter and said first adder, said second high pass filter having a lower frequency corresponding to the difference between said cut-off and said sampling frequencies, said second phase shifter being adapted to retard the phase of signals lying within the pass band of said second bandpass filter by approximately 120 degrees; means connecting the output of said second high pass filter to said second adder; and a sampler adapted to be operated at said sampling frequency and connected so as to receive the outputs of said first and second adders and said low pass filter and to impress them upon said channel filter.

22. A color television receiver comprising in combination: a detector; a sampler connected to the output of said detector; a plurality of output circuits connected to said sampler; means connected to at least one of said sampler output circuits for limiting the signal derived from said one sampler output circuit to a predetermined range of frequencies; means including phase shifting apparatus connected to two others of said sampler output circuits for cross-feeding signals derived from said two other sampler output circuits in a range of frequencies greater than said predetermined frequency range; and amplitude limiting means for restricting the amplitude of said cross-fed signals to substantially one-half of the amplitude of signals of the same frequency present in said sampler output circuit to which said cross-fed signals are applied.

23. Signalling apparatus comprising in combination: a plurality of signal channels; and inter-channel cross-talk reducing means including a plurality of series combinations of bandpass filters and phase shifters to conduct signals therethrough in one direction, said series combinations being coupled in mutually opposite conducting directions between all signal channels except one, a low pass filter having a given upper frequency limit coupled into said one channel, and said bandpass filters having a lower frequency limit not less than said given frequency.

24. A color television transmitter for transmitting in a channel having a finite bandwidth, a composite signal representative of a plurality of colors of an object, said transmitter including in combination: means to derive a plurality of video signals respectively representative of a plurality of different colors of an object; sampling means to multiplex said video signals at a rate sufficiently high to produce a cross-talk region for certain video signals, said cross-talk region including at least those of said video signals having such frequencies that the modulation of them by said sampling means produces fewer side bands within the finite bandwith of said channel than there are individual color representative signals; means to limit the frequency spectrum of at least one of said video signals so as to be no greater than the lower frequency of said cross-talk region; and means to apply said video signals including said frequency limited video signal to said sampling means, thereby to produce in the output of said sampling means a composite signal representing information relative to all of said plurality of object colors outside of said cross-talk region and representing information relative to less than all of said object colors inside of said cross-talk region.

25. A color television transmitter for transmitting, in a channel having a given frequency pass band, a composite signal representative of a plurality of colors of an object including: means for deriving a plurality of signals each representing one of said object colors; means for effectively modulating a sampling wave with substantially equal frequency bands of said signals, the frequency bands of all of said signals extending up to at least the lower frequency of a cross-talk region, said cross-talk region comprising those of said signals having such frequencies that the modulation of said sampling wave by them produces fewer side bands within said pass band than there are individual color representative signals; and means for effectively limiting the frequency spectrum of one of said signals to a maximum frequency no higher than the lower frequency of said cross-talk region.

26. In a color television system having a given frequency pass band, a receiver including in combination: means for receiving a composite wave representative of a plurality of colors of an object and including a sampling wave modulated by a plurality of signals representing said object colors, one of said signals having a more limited frequency spectrum than the frequency spectrum of another of said signals, said limited frequency spectrum constituting a cross-talk free region and including only those signals having such frequencies that the modulation of said sampling wave by them produces at least as many side bands within the pass band of said system as there are individual color representative signals, sampling means operating at the frequency of said sampling wave and adapted to recover said color representative signals from said composite wave; and means for effectively limiting the frequency spectrum of said one signal to frequencies in said cross-talk free region.

27. In a color television system having a given frequency pass band, a receiver including in combination: means for receiving a composite signal representative of the colors of an object including an oscillating wave having a plurality of phases respectively modulated in amplitude by a plurality of modulating video signals representing respective colors of said object, at least one of said video signals having a different frequency band width than that of another of said video signals, one of said frequency bands constituting a cross-talk free region and including only such modulating video signals that the modulation of said oscillating wave by them produces at least as many side bands within said pass band as there are individual color representative video signals and another of said frequency bands constituting a cross-talk region and including such modulating video signals that the modulation of said oscillating wave by them produces fewer side bands within said pass band than there are individual color representative video signals; means for sampling said composite signal to separately recover said respective video signals; and means coupled to said sampling means for effectively restricting the band width of one of said video signals derived from said sampling means to the lower one of said different frequency bands of modulating video signals.

References Cited in the file of this patent

UNITED STATES PATENTS

| | | |
|---|---|---|
| 1,801,657 | Buyko | Apr. 21, 1932 |
| 2,272,589 | Steinmetz | Feb. 10, 1942 |
| 2,282,046 | Goldsmith | May 5, 1942 |
| 2,408,063 | Grieg | Sept. 24, 1946 |
| 2,464,125 | Fisher | Mar. 8, 1949 |
| 2,529,564 | Miller | Nov. 14, 1950 |
| 2,541,023 | Beatty | Feb. 13, 1951 |
| 2,549,422 | Carbrey | Apr. 17, 1951 |
| 2,551,816 | Staal | May 8, 1951 |
| 2,554,693 | Bedford | May 20, 1951 |
| 2,580,421 | Guanella | Jan. 1, 1952 |
| 2,657,253 | Bedford | Oct. 27, 1953 |
| 2,664,462 | Bedford et al. | Dec. 29, 1953 |